US012580846B2

(12) United States Patent
Wang

(10) Patent No.: US 12,580,846 B2
(45) Date of Patent: Mar. 17, 2026

(54) DATA FORWARDING METHOD AND SYSTEM, ELECTRONIC DEVICE, AND STORAGE MEDIUM

(71) Applicant: ZTE CORPORATION, Shenzhen (CN)

(72) Inventor: Qianyu Wang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 82 days.

(21) Appl. No.: 18/690,729

(22) PCT Filed: May 7, 2022

(86) PCT No.: PCT/CN2022/091545
§ 371 (c)(1),
(2) Date: Mar. 9, 2024

(87) PCT Pub. No.: WO2023/050818
PCT Pub. Date: Apr. 6, 2023

(65) Prior Publication Data
US 2024/0380687 A1 Nov. 14, 2024

(30) Foreign Application Priority Data

Sep. 30, 2021 (CN) .......................... 202111155660.3

(51) Int. Cl.
*H04L 45/24* (2022.01)
*H04L 12/46* (2006.01)
(Continued)

(52) U.S. Cl.
CPC .......... *H04L 45/24* (2013.01); *H04L 12/4633* (2013.01); *H04L 45/38* (2013.01); *H04L 45/586* (2013.01); *H04L 47/125* (2013.01)

(58) Field of Classification Search
CPC ..... H04L 45/24; H04L 12/4633; H04L 45/38; H04L 45/586; H04L 47/125; H04L 45/02;
(Continued)

(56) References Cited

U.S. PATENT DOCUMENTS 10,083,026 B1 * 9/2018 Venkata .................. G06F 8/656
10,103,995 B1 * 10/2018 Baveja .................. H04L 63/101
(Continued)

FOREIGN PATENT DOCUMENTS

CN 101572667 A 11/2009
CN 107547348 A 1/2018
(Continued)

OTHER PUBLICATIONS

Sajassi Cisco R Aggarwal Arktan N Bitar Verizon Aldrin Isaac Bloomberg A: "Requirements for Ethernet VPN (EVPN); draft-ietf-l2vpn-evpn-rep-07.txt", Requirements for Ethernet VPN (EVPN); Draft—IETF-L2VPN-EVPN-REQ-07.TXT, Internet Engineering Task Force, IETF; Standardworkingdraft, Internet Society(ISOC)4, Rue Des Falaises CH-1205 Geneva Switzerland, Feb. 7, 2014 ( Feb. 7, 2014 ) , pp. 1-16, XP015096515.
(Continued)

*Primary Examiner* — Chris Parry
*Assistant Examiner* — Dixon F Dabipi
(74) *Attorney, Agent, or Firm* — NZ Carr Law Office

(57) ABSTRACT

Disclosed are a data forwarding method and system, an electronic device, and a storage medium. The data forwarding method is applied to a forwarding device in an overlay network; the forwarding device is communicationally connected to a management device; the management device is configured to manage at least one forwarding device; each forwarding device includes multiple virtual members. The method includes: receiving a forwarding strategy distributed by a management device, wherein the forwarding strategy
(Continued)

includes: if a forwarding device is a first-hop device, selecting the next hop in a first group, or if the forwarding device is a non-first-hop device, selecting the next hop in a second group, the first group contains all virtual members of an equal-cost multi-path routing (ECMP) group of the forwarding device, and the second group contains only local virtual members of the ECMP group; and performing data forwarding according to the forwarding strategy.

17 Claims, 8 Drawing Sheets

(51) Int. Cl.
  *H04L 45/00*        (2022.01)
  *H04L 45/586*       (2022.01)
  *H04L 47/125*       (2022.01)

(58) Field of Classification Search
  CPC ......... H04L 45/42; H04L 45/50; H04L 45/64;
                                          H04L 12/46
  See application file for complete search history.

(56)                  References Cited

U.S. PATENT DOCUMENTS

| | | | | |
|---|---|---|---|---|
| 10,200,274 | B1 * | 2/2019 | Suryanarayana | ....... H04L 49/70 |
| 2013/0329730 | A1 | 12/2013 | Zhang et al. | |

| | | | | |
|---|---|---|---|---|
| 2014/0153577 | A1 * | 6/2014 | Janakiraman | ....... H04L 49/3009 |
| | | | | 370/392 |
| 2015/0244617 | A1 * | 8/2015 | Nakil | ...................... H04L 41/40 |
| | | | | 709/224 |
| 2018/0351788 | A1 * | 12/2018 | Tammana | ............... H04L 41/22 |
| 2019/0104069 | A1 * | 4/2019 | Kommula | ........... H04L 43/0876 |
| 2019/0386891 | A1 * | 12/2019 | Chitalia | .............. H04L 43/0817 |
| 2020/0059459 | A1 * | 2/2020 | Abraham | ............ H04L 63/0485 |
| 2020/0106744 | A1 * | 4/2020 | Miriyala | .............. H04L 43/026 |
| 2022/0166705 | A1 * | 5/2022 | Froese | .................... G06F 13/28 |

FOREIGN PATENT DOCUMENTS

| | | | |
|---|---|---|---|
| CN | 107634905 | A | 1/2018 |
| CN | 109246017 | A | 1/2019 |
| CN | 109981455 | A | 7/2019 |
| CN | 109995654 | A | 7/2019 |
| CN | 111756830 | A | 10/2020 |
| CN | 112565045 | A | 3/2021 |
| WO | 2015147942 | A1 | 10/2015 |

OTHER PUBLICATIONS (ISA/237) Written Opinion of the International Searching Authority dated Jul. 27, 2022.

The international search report of the corresponding PCT Application No. PCT/CN2022/091545 mailed on Jul. 27, 2022 along with English translation thereof.

* cited by examiner

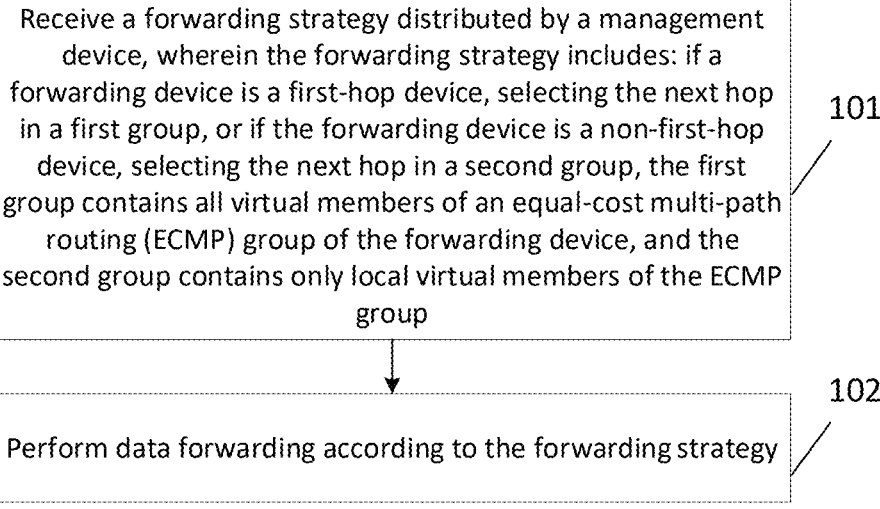

Receive a forwarding strategy distributed by a management device, wherein the forwarding strategy includes: if a forwarding device is a first-hop device, selecting the next hop in a first group, or if the forwarding device is a non-first-hop device, selecting the next hop in a second group, the first group contains all virtual members of an equal-cost multi-path routing (ECMP) group of the forwarding device, and the second group contains only local virtual members of the ECMP group 101

Perform data forwarding according to the forwarding strategy 102

DATA FORWARDING METHOD AND SYSTEM, ELECTRONIC DEVICE, AND STORAGE MEDIUM

CROSS REFERENCE

The present application is corresponding to the International Application No. PCT/CN2022091545, filed on May 7, 2022, which is based on and claims priority to Chinese Patent Application No. 202111155660.3, filed on Sep. 30, 2021, the entire content of which is hereby incorporated into the present application by reference.

TECHNICAL FIELD

Embodiments of the present application relate to the field of communications, in particular to a data forwarding method and system, an electronic device, and a storage medium.

BACKGROUND

With the development of Internet technology, the number of 5G users has explosively increased, so it is necessary to provide greater device connection and network capacity than the previous generation technology. For 5G, a major change is the virtualization trend today. 5G network will use network slicing technology to divide a physical infrastructure into multiple virtual networks, so that each slice can provide different and unique connections under the same infrastructure. Virtual networks mostly use overlay technology to provide different requirements quickly. In a large networking scenario, different traffic from the same node can choose different paths to flow to the destination, so as to prevent the overload of a single path and provide high reliability and high-performance and reliable network services for various applications. Therefore, the overlay scenario also needs equal-cost multi-path (ECMP) technology.

However, in order to realize that the nodes do not cause a loop when selecting ECMP members independently, the routing strategy enables a local priority strategy, that is, the local virtual members of ECMP groups are preferentially selected for data forwarding, resulting in that when the source address and destination address of the message are located on the same node, the data forwarding traffic cannot share the load to ECMP members of other nodes, so that the network data forwarding performance is low.

SUMMARY

Embodiments of the present application provide a data forwarding method, applied to a forwarding device in an overlay network; the forwarding device is in communication connection with a management device; the management device is configured to manage at least one forwarding device; each forwarding device includes multiple virtual members. The method includes: receiving a forwarding strategy distributed by a management device, wherein the forwarding strategy includes: if a forwarding device is a first-hop device, selecting the next hop in a first group, or if the forwarding device is a non-first-hop device, selecting the next hop in a second group, wherein the first group contains all virtual members of an equal-cost multi-path routing (ECMP) group of the forwarding device, and the second group contains only local virtual members of the ECMP group; and performing data forwarding according to the forwarding strategy.

2

Embodiments of the present application further provide a data forwarding method, applied to a management device in an overlay network; the management device is in communication connection with at least one forwarding device; the management device is configured to manage the at least one forwarding device; each forwarding device includes multiple virtual members. The method includes: acquiring routing information of each forwarding device; generating a forwarding strategy of each forwarding device according to the routing information; and distributing the forwarding strategy of each forwarding device to each forwarding device for each forwarding device to receive the forwarding strategy distributed by the management device and perform data forwarding according to the forwarding strategy, wherein the forwarding strategy includes: if a forwarding device is a first-hop device, selecting the next hop in a first group, or if the forwarding device is a non-first-hop device, selecting the next hop in a second group, wherein the first group contains all virtual members of an equal-cost multi-path routing (ECMP) group of the forwarding device, and the second group contains only local virtual members of the ECMP group.

Embodiments of the present application further provide a data forwarding system, applied to a forwarding device and a management device in an overlay network; the management device is in communication connection with at least one forwarding device; the management device is configured to manage the at least one forwarding device; each forwarding device includes multiple virtual members. The management device is configured to acquire routing information of each forwarding device, generate a forwarding strategy of each forwarding device according to the routing information, and distribute the forwarding strategy of each forwarding device to each forwarding device for each forwarding device to receive the forwarding strategy distributed by the management device and perform data forwarding according to the forwarding strategy, wherein the forwarding strategy includes: if a forwarding device is a first-hop device, selecting the next hop in a first group, or if the forwarding device is a non-first-hop device, selecting the next hop in a second group, wherein the first group contains all virtual members of an equal-cost multi-path routing (ECMP) group of the forwarding device, and the second group contains only local virtual members of the ECMP group. The forwarding device is configured to receive the forwarding strategy distributed by the management device, and perform data forwarding according to the forwarding strategy.

Embodiments of the present application further provide an electronic device, including: at least one processor; and a memory in communication connection with the at least one processor, wherein the memory stores instructions executable by the at least one processor, and the instructions are executed by the at least one processor to enable the at least one processor to perform the data forwarding methods.

Embodiments of the present application further provide a non-transitory computer-readable storage medium, storing a computer program, wherein the computer program, when executed by a processor, implements the above data forwarding methods.

BRIEF DESCRIPTION OF FIGURES

FIG. 1 is a flowchart of a data forwarding method applied to a forwarding device according to an embodiment of the present disclosure;

DETAILED DESCRIPTION

Figure 2:
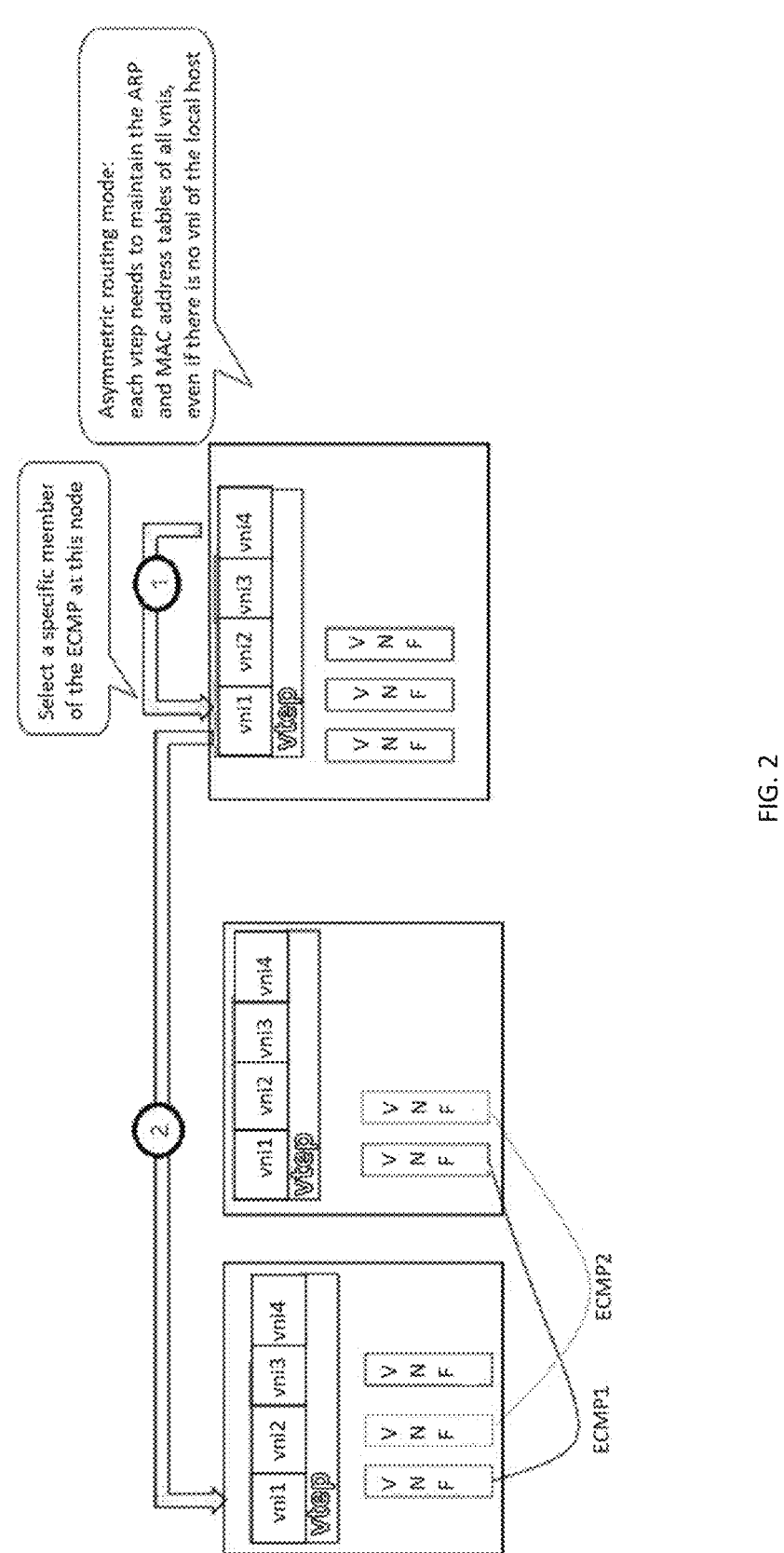
FIG. 2 is a first schematic diagram of a forwarding path according to an embodiment of the present disclosure.

In order to make the objects, technical solutions and advantages of the embodiments of the present application clearer, various embodiments of the present application will be described in detail below with reference to the accompanying drawings. However, those of ordinary skill in the art can appreciate that in the various embodiments of the present application, numerous technical details are set forth in order to provide the reader with a better understanding of the present application. However, the technical solution claimed in the present application can be implemented without these technical details and with various variations and modifications based on the following embodiments. The following division of various embodiments is for convenience of description and should not be construed as limiting the specific implementations of the present application, and various embodiments may be referred to in conjunction with each other without contradiction.

The main objective of the embodiments of the present application is to provide a data forwarding method and system, an electronic device, and a storage medium, so as to improve the network data forwarding performance.

An embodiment of the present application relates to a data forwarding method, as shown in FIG. 1, including the following steps.

At step 101, a forwarding strategy distributed by a management device is received, wherein the forwarding strategy includes: if a forwarding device is a first-hop device, selecting the next hop in a first group, or if the forwarding device is a non-first-hop device, selecting the next hop in a second group, wherein the first group contains all virtual members of an equal-cost multi-path routing (ECMP) group of the forwarding device, and the second group contains only local virtual members of the ECMP group.

At step 102, data forwarding is performed according to the forwarding strategy.

The data forwarding method of this embodiment is applied to a forwarding device in an overlay network, the forwarding device is in communication connection with the management device, and the management device is configured to manage at least one forwarding device, and each forwarding device includes a plurality of virtual members. The Overlay network may be simply understood as building a logical network on top of a physical network. Virtual extensible Local Area Network (VXLAN for short) is one of NVO3 (Network Virtualization over Layer 3) standard technologies defined by IETF, and adopts an L2 over L4 (MAC-in-UDP) message encapsulation mode to encapsulate Layer 2 messages with a Layer 3 protocol, which allows Layer 2 networks to be extended in the range of Layer 3 while satisfying the requirements of large Layer 2 virtual migration and multi-tenancy in data centers. NVO3 is a general term for technologies that build virtual networks based on Layer 3 IP overlay networks, and VXLAN is just one of NVO3 technologies. The forwarding device of this embodiment may be a VXLAN Tunnel Endpoints (VTEP for short) device, the VTEP device may be a switch, or a server where a virtual machine is located, the management device may be a management device in a network, and the VTEP device or a cloud management system, such as a neutron component of OPENSTACK, or a virtual network controller, such as a Software Defined Network (SDN for short).

With the explosive increase of the number of 5G users, it is necessary to provide greater device connection and network capacity than the previous generation technology. For 5G, a major change is the virtualization trend today. 5G network will use network slicing technology to divide a physical infrastructure into multiple virtual networks, so that each slice can provide different and unique connections under the same infrastructure. In order to achieve this flexibility, each slice should be able to access different types of resources, whether physical or virtual, such as Virtualized Network Function (VNF for short), so 5G completely changes the network architecture through SDN and network control programmability. Network control is used in an open software system to virtualize the actual physical network. In terms of implementation, most virtual networks use overlay technology to quickly provide different requirements. For large networking scenarios, different traffic from the same node can select different paths to flow to the destination, which can prevent the overload of a single path and provide high performance and reliable network services for various applications, so the overlay scenario also needs ECMP technology.

In large-scale scenarios, if asymmetric routing is used, each VTEP device should maintain the Media Access Control layer (MAC for short) and Address Resolution Protocol (ARP for short) of all virtualized network identifiers (vni for short). For example, there are four virtual members on the VTEP device, namely, the first member vni1, the second member vni2, the third member vni3 and the fourth member vni4. When forwarding, a specific member of the ECMP can be selected at this node. Asymmetric routing mode means that each VTEP needs to maintain the ARP and MAC address tables of all vnis, even if there is no vni of the local host. This needs to involve large-capacity ARP and MAC tables, resulting in a waste of resources, as shown in FIG. 2.

Figure 3:
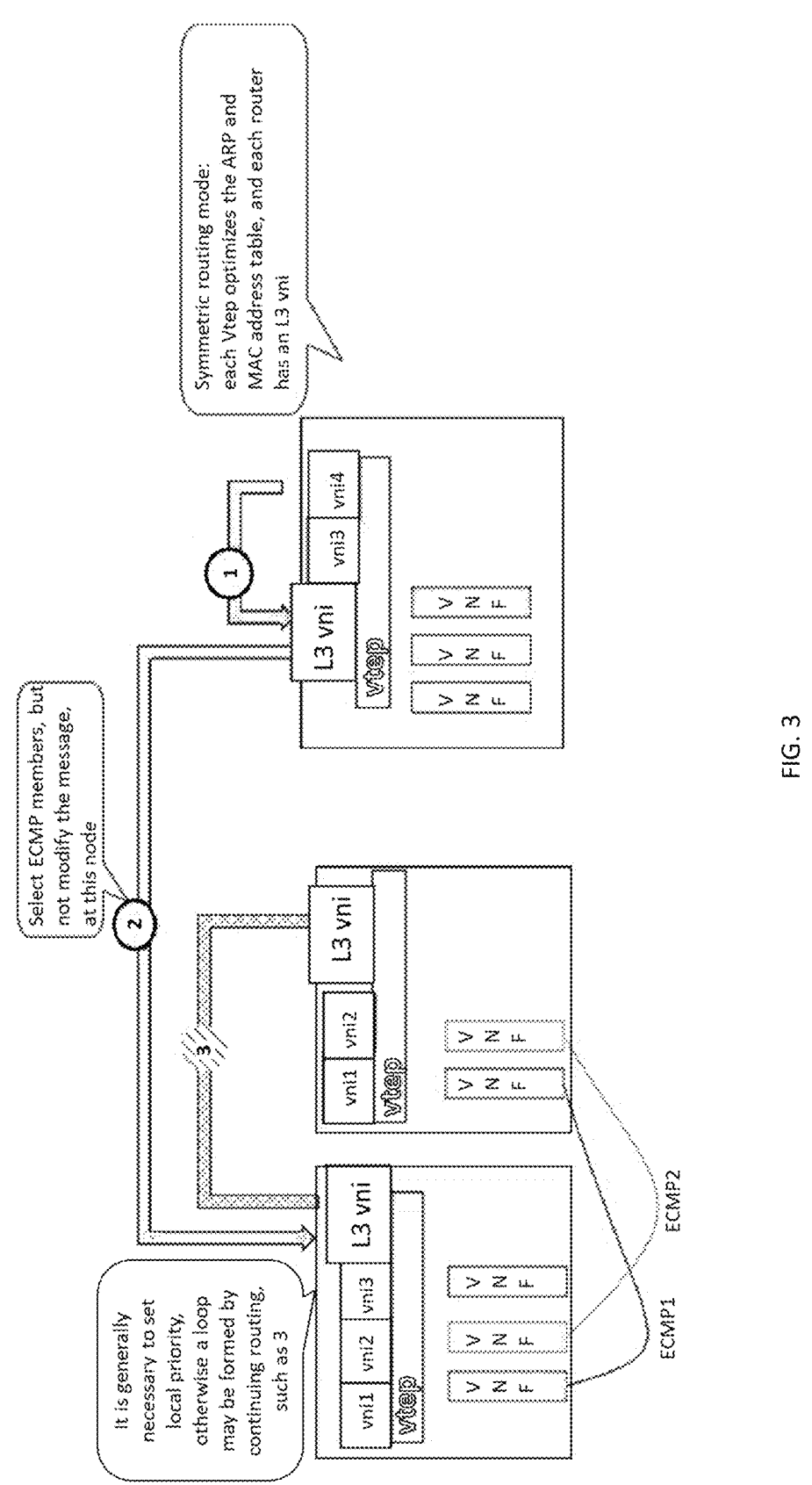
FIG. 3 is a second schematic diagram of a forwarding path according to an embodiment of the present disclosure.
Figure 4:
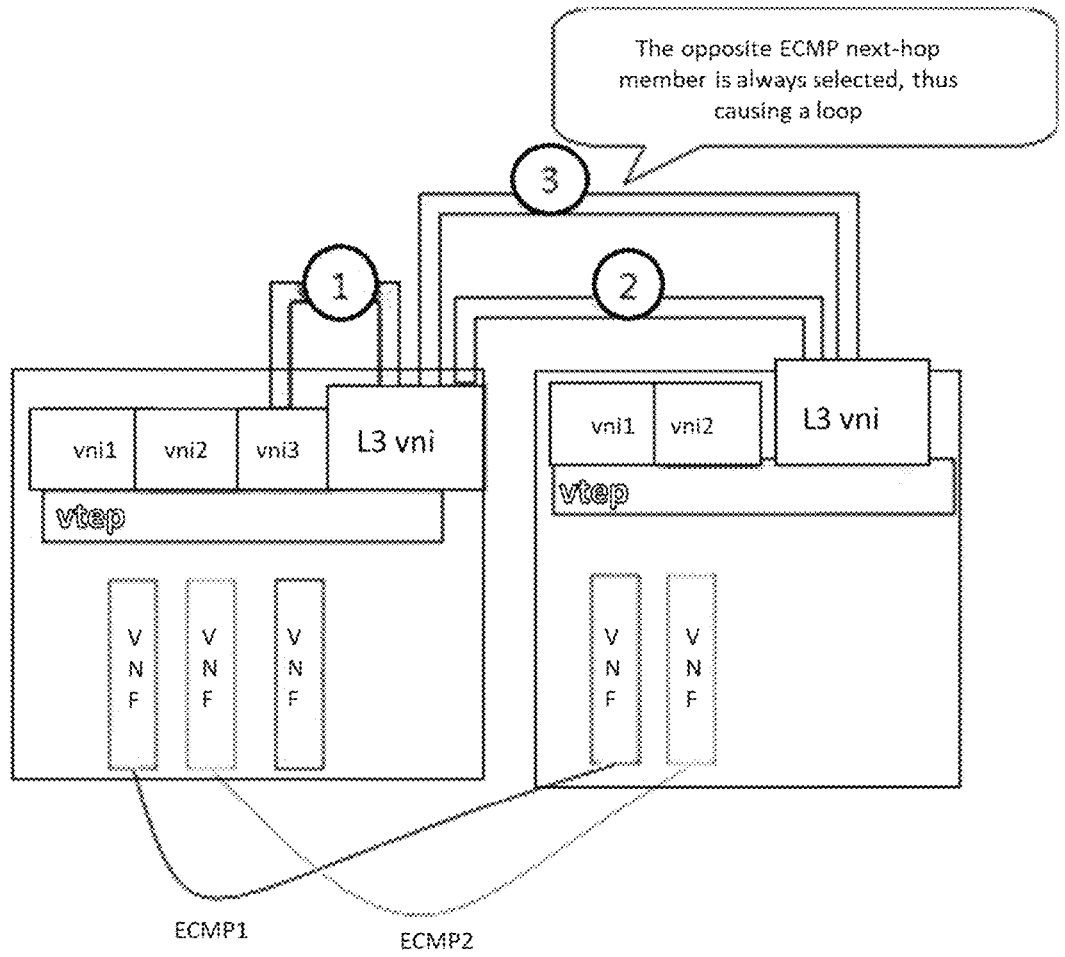
FIG. 4 is a third schematic diagram of a forwarding path according to an embodiment of the present disclosure.

In order to reduce MAC/ARP table entries, symmetric routing technology is generally adopted. In symmetric routing, each VTEP optimizes the ARP and MAC address table, and each router has an L3 vni. As shown in FIG. 3, when dealing with ECMP routing in symmetric routing, because each node performs routing independently, different ECMP group members are connected to different VTEP devices, wherein it is generally necessary to set local priority, otherwise a loop may exist by continuing routing. As shown in FIG. 4, ECMP group members fall on VTEP1 devices and VTEP2 devices respectively, and the message sent by virtual network function (VNF) may select ECMP group members on VTEP2 devices for the next hop when located on VTEP1 devices, and may select group members on VTEP1 for the next hop when located on VTEP2 devices, thereby causing a loop.

Figure 5:
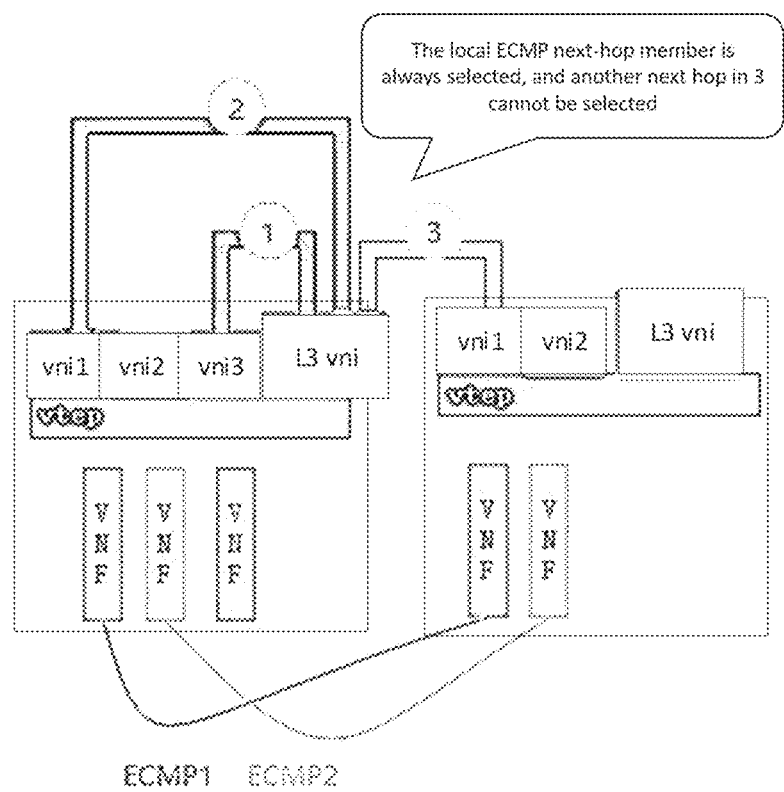
FIG. 5 is a fourth schematic diagram of a forwarding path according to an embodiment of the present disclosure.

In order to avoid the loop caused by the independent routing by each node, the local priority strategy is generally chosen, that is, if there is a directly connected ECMP group on the present VTEP device, the ECMP group of the present device is sent to in priority. Enabling the local priority strategy results in that the load cannot be shared to ECMP members of other nodes when the source and destination are on the same node, resulting in uneven traffic. As shown in FIG. 5, the local ECMP next hop member will always be selected, and another next hop in 3 cannot be selected.

In the data forwarding method of this embodiment, by selecting the next hop among the local virtual members of the ECMP group, formation of loops in the data forwarding process caused by independent routing of nodes can be avoided, and the data forwarding efficiency of the network can be improved. When the forwarding device is a first-hop device, the next hop is selected from all virtual members of the ECMP group, and even when the source address and destination address of the message are located on the same node, the data forwarding traffic can be shared to other nodes, thus balancing the data forwarding traffic, and improving the response speed and overall performance of the network, so that the network can achieve elastic traffic scaling. Therefore, when the forwarding device is the first-hop device, the next hop is selected in the first group, and when the forwarding device is the non-first-hop device, the next hop is selected in the second group. Data forwarding performed with this strategy can improve the network data forwarding performance.

The implementation details of the data forwarding method of this embodiment will be specifically described below, and the following implementation details are provided only for convenience of understanding, and are not necessary to implement this solution.

In step 101, a forwarding device receives a forwarding strategy distributed by a management device, wherein the forwarding strategy includes: if the forwarding device is a first-hop device, selecting the next hop in a first group, or if the forwarding device is a non-first-hop device, selecting the next hop in a second group, wherein the first group contains all virtual members of an equal-cost multi-path routing (ECMP) group of the forwarding device, and the second group contains only local virtual members of the ECMP group.

Specifically, the forwarding strategy is configured by the management device, and the management device acquires the routing information of each forwarding device and generates the forwarding strategy of each forwarding device according to the routing information. The forwarding device may select one or more devices in the first group or the second group as the next-hop device.

In one example, the forwarding device selecting the next hop specifically includes: selecting all virtual members in the group as the next-hop device and performing load sharing among all virtual members.

In this embodiment, all the virtual members in the group are selected as the next-hop devices, and load sharing is performed among all the virtual members, thereby performing traffic sharing among all the virtual members in the entire group, so that the network data forwarding performance is further improved.

In step 102, the forwarding device performs data forwarding according to the forwarding strategy.

Specifically, after receiving the to-be-forwarded message, the forwarding device judges, according to the forwarding strategy, whether the present device is the first-hop device, selects the next hop from all virtual members in the ECMP group if the present device is the first-hop device, and selects the next hop from the second group, i.e., the local virtual members of the ECMP group if the present device is not the first-hop device.

Further, the forwarding device generates a forwarding rule according to the forwarding strategy and the type of the forwarding device, and performs data forwarding according to the forwarding rule.

In this embodiment, the forwarding rule is generated according to the forwarding strategy and the type of a forwarding device, and data forwarding is performed according to the forwarding rule, so that the network data forwarding performance can be improved.

In one example, the forwarding rule includes a general virtual routing table and a local virtual routing table, and a flow table. The forwarding device generates the forwarding rule according to the forwarding strategy by: generating a flow table according to the forwarding strategy under the condition that the forwarding device is an openflow device; and setting a general virtual routing table and a local virtual routing table according to the forwarding strategy under the condition that the forwarding device is an EVPN device.

In this embodiment, when the forwarding device is an openflow device, a flow table is generated according to the forwarding strategy, and when the forwarding device is an EVPN (Ethernet VPN) device, a general virtual routing table and a local virtual routing table are set according to the forwarding strategy, so that the forwarding rules of the openflow device and the EVPN device can be changed and the network data forwarding performance can be improved.

In one example, after receiving the forwarding strategy distributed by the management device, the forwarding device also receives an updated forwarding strategy distributed by the management device, and performs data forwarding according to the updated forwarding strategy.

In this embodiment, by receiving the updated forwarding strategy distributed by the management device, and performing data forwarding according to the updated forwarding strategy, data forwarding can be performed with a new forwarding strategy, thus improving the network data forwarding performance.

Figure 6:
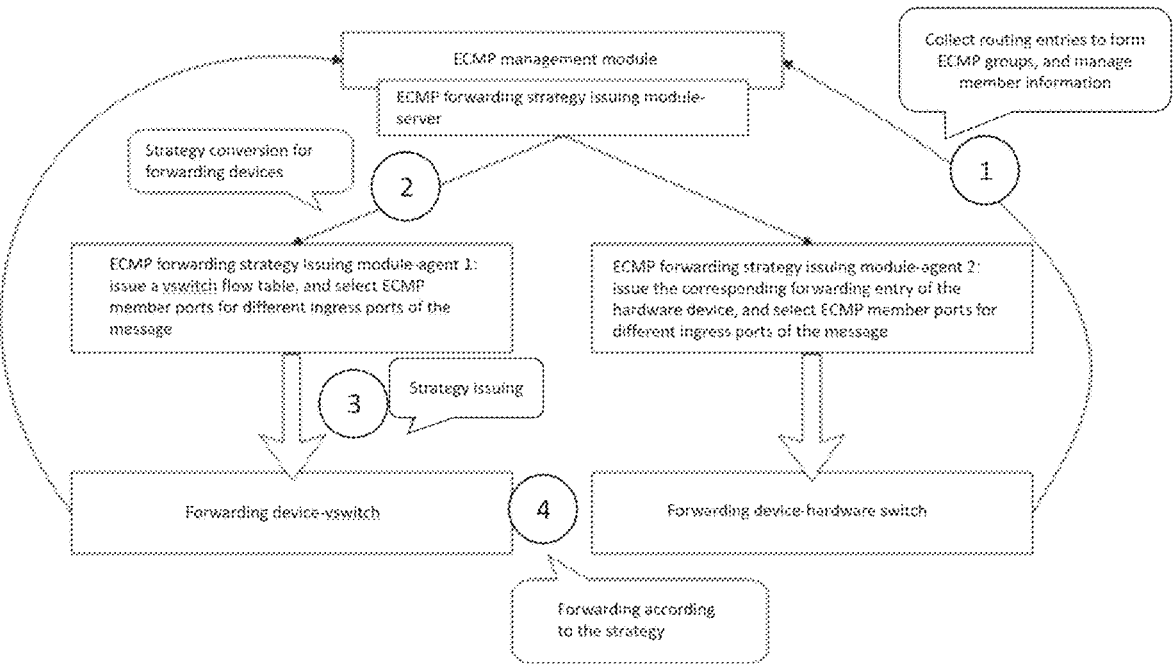
FIG. 6 is a flowchart of a data forwarding method according to an embodiment of the present disclosure.

In one example, the management device is internally provided with an ECMP management module and an ECMP forwarding strategy module, the forwarding device is internally provided with an ECMP forwarding execution module, as shown in FIG. 6, wherein the ECMP management module at the server side is configured to collect routing information of VTEP forwarding devices to form global ECMP groups, and attributes, locations, topological relationships of the members of the groups, and guide subsequent ECMP forwarding strategy modules to generate strategies and synchronize the generated strategies to the corresponding devices. The ECMP forwarding strategy module at the agent side is configured to convert information acquired from the ECMP management module into ECMP forwarding strategies of the devices, and calculate the ECMP forwarding strategy of each VTEP device according to the locations of ECMP group members, for the vswitch, a vswitch flow table can be issued, and the ECMP member ports are selected for the different ingress ports of the message, and for the switch, the corresponding forwarding entry of the hardware forwarding device can be issued, and the ECMP member ports are selected for the different ingress ports of the message. In the ECMP forwarding execution module, a virtual forwarding device vswitch, or a hardware forwarding device switch is configured to generate an ECMP forwarding strategy into a forwarding rule on each VTEP device. A VTEP device may be an openflow-type device or an EVPN-type device so that forwarding may be performed according to the strategy.

Figure 7:
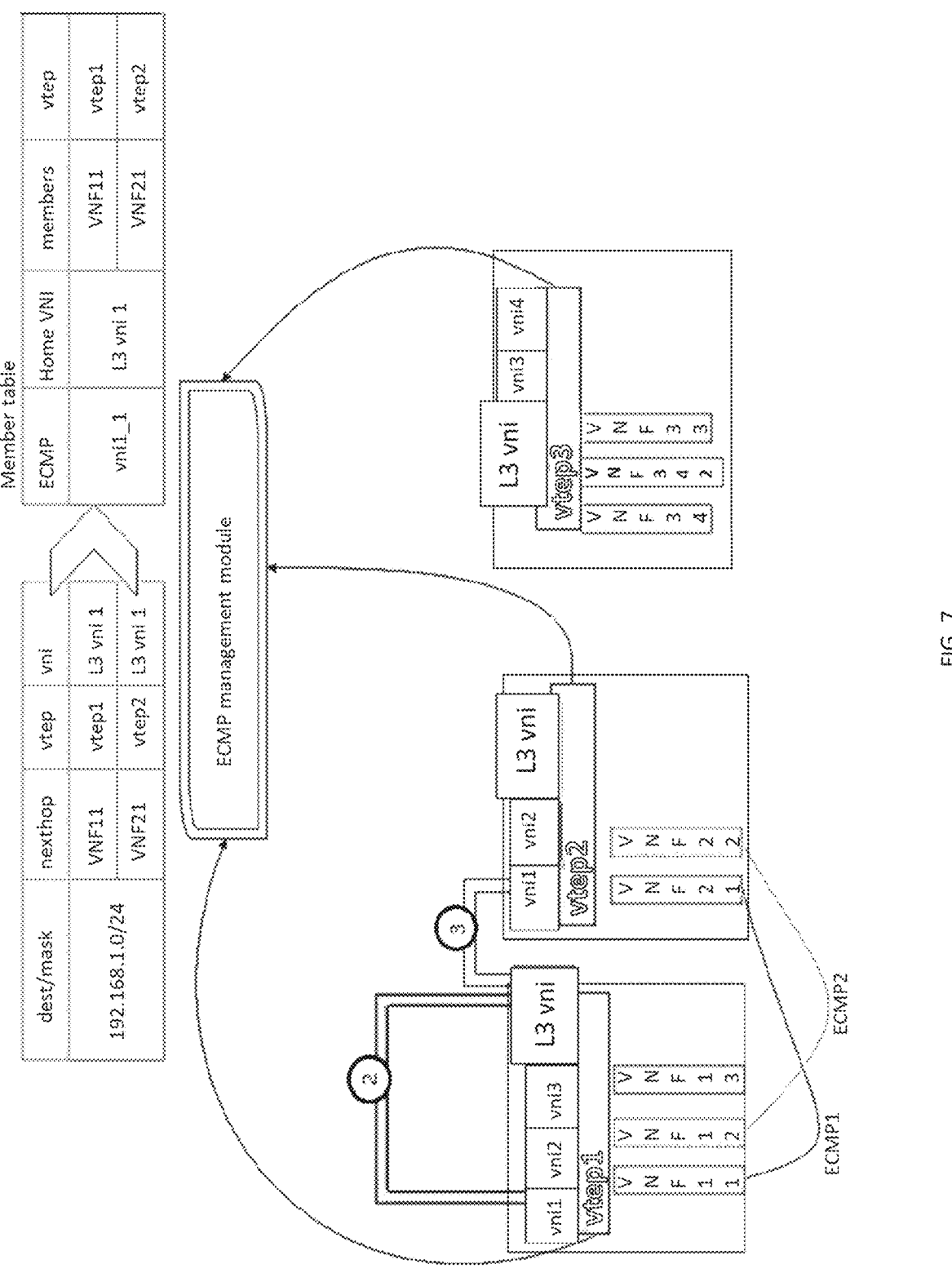
FIG. 7 is a schematic diagram of routing information acquisition according to an embodiment of the present disclosure.

As shown in FIG. 7, data forwarding includes the following flows.

1) By interacting with VTEP devices or cloud management systems (such as neutron components of OPEN-STACK) or virtual network controllers (such as SDN), the ECMP management module collects routing information in the network, and forms and maintains an ECMP group as well as member information table.

The process that the ECMP management module collects routing information and next hop process is as follows: the ECMP management module acquires all routing entries of each logical route instance (vroute), the key information of each routing entry including: vrouter identifier (RD or L3VNI), routing destination network segment (network prefix), and next hop (in the scenario of routing network elements, this next hop may be virtual machine address or port); and the ECMP management module extracts the ECMP group member information table (a group of routes with the same vrouter identifier (RD or L3VNI) and the destination network segment (network prefix)) according to the above information, the key information including the ECMP group identifier, the home vroute identifier (RD or L3VNI), next-hop members (which may specifically include the address or port information of the next hop), and the VTEP device where the members are located.

Figure 8:
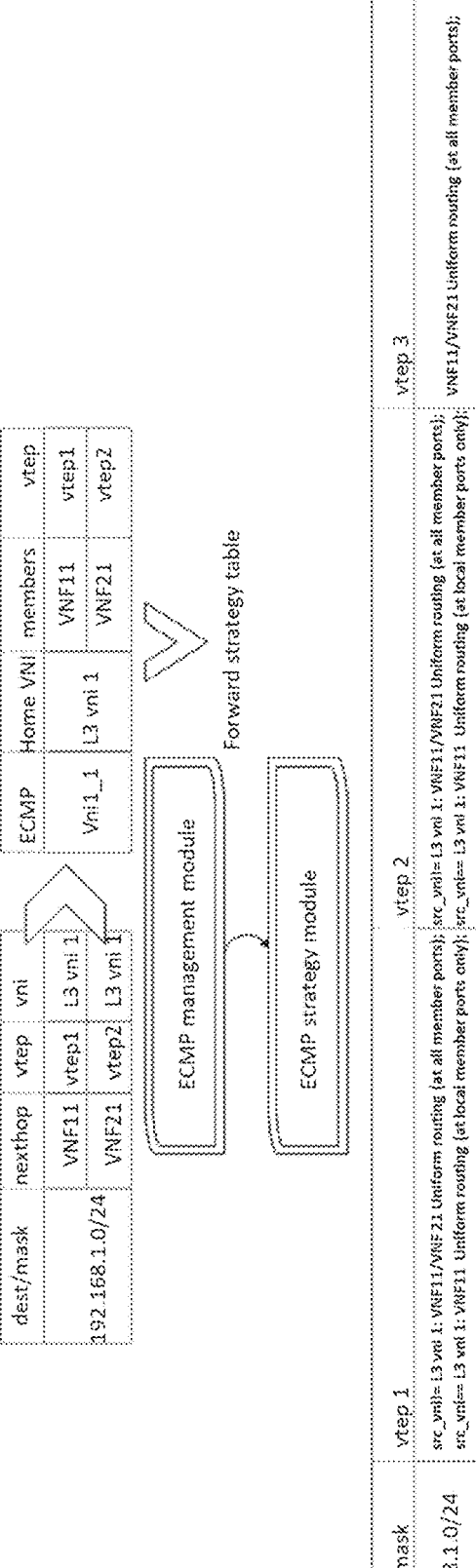
FIG. 8 is a schematic diagram of a routing strategy according to an embodiment of the present disclosure.

2) The ECMP forwarding strategy module acquires the ECMP information from the ECMP management module, and converts the ECMP information into the forwarding strategy of the device, as shown in FIG. 8.

3) The forwarding execution module converts the ECMP forwarding strategy into the forwarding rule of the VTEP device. If the VTEP device is an openflow forwarding device, the forwarding rule is converted into an openflow table. If the VTEP device is an EVPN forwarding device, the forwarding rule is converted into a Boarder Gateway Protocol (BGP for short) message. Implementation methods of the forwarding rule will be described below, respectively.

For openflow devices, flow table entries are received through the openflow protocol, and ECMP is typically implemented by using the group table defined in the openflow protocol. The group table in the protocol is defined as follows:

| GroupIdentifier | GroupType | Counters | Action Bucket |
| --- | --- | --- | --- |

Here, the group table type is extended, a new type is added with a value of 16 and a name of conditional, indicating that a different bucket may be selected according to the defined conditions. Defined as follows:

```
enum ofp_group_type{
  OFPGT_ALL=0,/*All(multicast/broadcast)group.*/
  OFPGT_SELECT=1,/*Select group.*/
  OFPGT_INDIRECT=2,/*Indirect group.*/
  OFPGT_FF=3,/*Fast failover group.*/
  OFPGT_CONDITION=16,/*conditional group.*/
```

-continued

```
};
```

The bucket table of Openflow protocol also needs to add a new type corresponding to the conditional group table, and the value here is also 16, which is defined as follows.

```
/*Group bucket property types.*/
enum ofp_group_bucket_prop_type{
  OFPGBPT_WEIGHT=0,/*Select groups only.*/
  OFPGBPT_WATCH_PORT=1,/*Fast failover groups only.*/
  OFPGBPT_WATCH_GROUP=2,/*Fast failover groups only.*/
  OFPGBPT_COND_GROUP=16,/*Conditional groups only.*/
  OFPGBPT_EXPERIMENTER=0xFFFF,/*Experimenter defined.*/
};
The structure of the new bucket type is as follows:
struct ofp_group_bucket_prop_cond{
  uint16_t type;/*OFPGBPT_COND_GROUP.*/
  uint16_t length; /*8.*/
  uint16_t conditional_key;/*conditionally matched key value*/
  uint16_t conditional_type;/*conditionally matched type*/
  uint32_t conditional_val;/*value matched with key value.*/
};
``` the fields are described as follows:

condition_key is defined in an extensible manner, and is currently defined as:

0: reserved;

1: metadata; and

2: in_port.

condition_type is is defined in an extensible manner, and is currently defined as:

0: reserved;

1: equal to;

2: not equal to; and

3: including;

conditional_val is the specific value that matches, and only numerical values are supported at present.

If conditional_key is set, then load sharing is participated only when conditional_key and conditional_val satisfy the definition of condition_type; if conditional_key is not set by default, it is indicated that load sharing calculation is participated.

The group feature field of Openflow is added with the following value to inform the management module that the present VTEP device supports a conditional group, defined as follows:

```
OFPGFC_CONDITIONAL=1<<7,/*Support conditional groups*/.
/*Group configuration flags*/
enum ofp_group_capabilities{
  OFPGFC_SELECT_WEIGHT=1<<0,/*Support weight for select
  groups*/
  OFPGFC_SELECT_LIVENESS=1<<1,/*Support liveness for select
  groups*/
  OFPGFC_CHAINING=1<<2,/*Support chaining groups*/
  OFPGFC_CHAINING_CHECKS=1<<3,/*Check chaining for loops and
  delete*/
  OFPGFC_CONDITIONAL=1<<7,/*Support conditional groups*/
};
```

EXAMPLES ARE AS FOLLOWS

The forwarding strategy module determines to generate forwarding rules according to conditional based on the group type reported by the VTEP device.

The forwarding execution module tracks the openflow flow table group information issued by forwarding rule vtep1 as:

| Group Type | Bucket | condi- tional_key | condi- tional_type | condi- tional_key | Action |
|---|---|---|---|---|---|
| OFPGT__CON- DITION = 16 | 1 | 1: metadata | 2: not equal to | L3 vni 1 | Output: vnf21 |
| OFPGT_CON- DITION = 16 | 2 | 1: metadata | 2: not equal to | L3 vni 1 | Output: vnf11 |

The forwarding execution module tracks the openflow flow table group information issued by forwarding rule vtep2 as:

| Group Type | Bucket | condi- tional_key | condi- tional_type | condi- tional_key | Action |
|---|---|---|---|---|---|
| OFPGT_CON- DITION = 16 | 1 | 1: metadata | 2: not equal to | L3 vni 1 | Output: vnf11 |
|  | 2 | 1: metadata | 2: not equal to | L3 vni 1 | Output: vnf21 |

The message forwarding process is described as follows: VTEP1 receives the message sent by VNF13 and then saves the vni of the current message to the metadata field according to the message flow table action. Since the message sent by VNF13 is not a vxlan message and there is no vni information, the metadata is 0. When the group action is performed, it is first checked whether metadata is equal to L3 vni 1, if yes, then only the action of bucket2 can be performed; if no, then bucket1 and bucket2 can both be executed, and one of bucket1 and bucket2 is selected according to the original bucket. Therefore, the message sent by VNF13 can still be equally routed between 2 next hops, and VNF11 may be selected on VTEP1 as the next hop; VNF21 may also be selected on VTEP1 as the next hop, since VNF21 spans nodes, thus encapsulating the vxlan message, vni=L3 vni 1, and sends the message to VTEP2.

After receiving the message, the VTEP2 node saves the metadata as the vni number, namely L3 vni 1, because the message is a vxlan message, and when the group action is performed, only bucket2 can be selected because the metadata is equal to L3 vni 1, and therefore only the action of selecting bucket2 can be performed, and the message is sent to VNF21 for the next hop.

For EVPN devices, the BGP protocol of the VTEP device of EVPN exchanges forwarding rules. VTEP devices need to realize the following functions: VTEP devices group IP-VRF tables to form a local IP-VRF table (i.e., a local virtual routing table) and a general IP-VRF table (i.e., a general virtual routing table). The VTEP device maintains the local IP-VRF table and the general IP-VRF table through the BGP protocol. When the VTEP device forwards the L3 message, whether to look up the local IP-VRF table or the general IP-VRF table is determined according to the destination mac.

The flows of table maintenance and message forwarding are explained as follows, respectively: the VTEP device creates two tables for each router-id, which are a local IP-VRF table and a general IP-VRF table, respectively. The L2 forwarding table of the VTEP router is added with a table whose matching field is router-mac, and the action is to enter the local IP-VRF table to look up L3 forwarding rules. The forwarding strategy module sends the RT-5 route addition announcement of the BGP neighbor to the VTEP device, the VTEP device fetches the route entry, and after synthesizing the route, queries whether the next-hop address is in the locally learned arp table or in the arp table of the RT-2 announcement, and if the next-hop address is in neither table, the route is only saved to the local RT-5 route table without being added to the local IP-VRF table and the general IP-VRF; if the next hop address is in the arp table of the RT-2 announcement, then the route is saved to the local RT-5 routing table before being added to the general IP-VRF; if the next hop address is in the locally learned arp table, the route is saved to the local RT-5 routing table and added to the general IP-VRF and local IP-VRF tables at the same time. The VTEP device receives the RT-2 route announcement of the remote BGP neighbor, if the ip address of the announcement is the next hop of a certain RT-5 route composite route, then after the route is normally saved to the arp table, it is checked whether the route is in the general IP-VRF table, and if no, the route is added to the general IP-VRF. The VTEP device learns locally to the ARP, if the ip address is the next hop for a composite route in the RT-5 routing table, then after the route is normally saved to the arp table, it is checked whether the route is in the general IP-VRF, and if no, the route is added to the general IP-VRF, and it is checked whether the route is in the local IP-VRF, and if no, the route is added to the local IP-VRF. RT-5 route deletion announcements and ARP aging events are handled as deleting the corresponding next hop record from the table above.

The message forwarding flow of the EVPN device is as follows: after receiving the service message, the VTEP device first looks up the L2 forwarding table, and enters the general IP-VRF table, and applies ECMP rules in the general IP-VRF table if the destination mac is the gateway mac, and enters the local IP-VRF table, and applies ECMP rules in the local IP-VRF table if the destination mac is the router-mac.

In this embodiment, the physical location and topological relationship of each ECMP group member are collected and maintained by the management device, and the ECMP group of each VTEP device is managed according to the topological relationship. The same ECMP group is split into the following two groups on each VTEP device: a group containing all group members and a group where group members are directly connected to the present VTEP device, and the forwarding strategy of each VTEP device is calculated by combining the two ECMP groups split by each VTEP device. Each VTEP device converts the ECMP forwarding strategy of the present device into forwarding rules for traffic forwarding. Traffic is subjected to loading sharing among all ECMP group members of the first-hop device for uniform routing, and traffic is subjected to loading sharing among group members on non-first-hop devices that are directly connected to the present VTEP device, so that the non-first-hop device is prevented from sending messages to other VTEP devices to cause loops, and the uneven load sharing problem under the local priority strategy described above can also be avoided.

Figure 9:
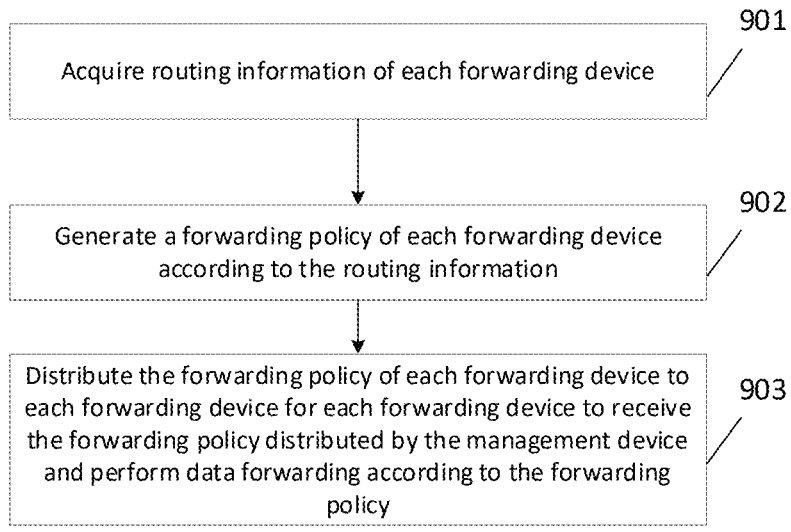
FIG. 9 is a flowchart of a data forwarding method applied to a management device according to an embodiment of the present disclosure.

The data forwarding method of this embodiment is applied to a management device in an overlay network, wherein the management device is in communication connection with at least one forwarding device, the management device is configured to manage the at least one forwarding device, each forwarding device includes a plurality of virtual members, as shown in FIG. 9, the data forwarding method includes the following.

At step 901, routing information of each forwarding device is acquired.

At step 902, a forwarding strategy of each forwarding device is generated according to the routing information.

At step 903, the forwarding strategy of each forwarding device is distributed to each forwarding device for each forwarding device to receive the forwarding strategy distributed by the management device and perform data forwarding according to the forwarding strategy.

Wherein, the forwarding strategy includes: if a forwarding device is a first-hop device, selecting the next hop in a first group, or if the forwarding device is a non-first-hop device, selecting the next hop in a second group, wherein the first group contains all virtual members of an equal-cost multi-path routing (ECMP) group of the forwarding device, and the second group contains only local virtual members of the ECMP group.

In one example, after distributing the forwarding strategy of each forwarding device to each forwarding device, the management device also updates the routing information after a network topology changes, updates the forwarding strategy of each forwarding device according to the updated routing information, and distributes the updated forwarding strategy of each forwarding device to each forwarding device.

Since this embodiment corresponds to the above-described embodiments, this embodiment may be implemented in cooperation with the above-described embodiments. The relevant technical details mentioned in the above embodiments are still valid in this embodiment, and the technical effects that can be achieved in the above embodiments can also be achieved in this embodiment, and will not be repeated here in order to reduce repetition. Correspondingly, the relevant technical details mentioned in this embodiment can also be applied to the above embodiments.

Figure 10:
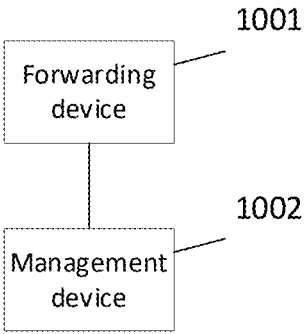
FIG. 10 is a schematic diagram of a data forwarding system according to an embodiment of the present disclosure.

An embodiment of the present application relates to a data forwarding system, as shown in FIG. 10, including: a forwarding device 1001 and a management device 1002 in an overlay network; the management device 1002 is in communication connection with at least one forwarding device 1001, the management device 1002 is configured to manage at least one forwarding device 1001, and each forwarding device 1001 includes a plurality of virtual members, Wherein, the management device 1002 is configured to acquire routing information of each forwarding device 1001, generate a forwarding strategy of each forwarding device 1001 according to the routing information, and distribute the forwarding strategy of each forwarding device 1001 to each forwarding device 1001 for each forwarding device 1001 to receive the forwarding strategy distributed by the management device 1002 and perform data forwarding according to the forwarding strategy, wherein the forwarding strategy includes: if the forwarding device 1001 is a first-hop device, selecting the next hop in a first group, or if the forwarding device 1001 is a non-first-hop device, selecting the next hop in a second group, wherein the first group contains all virtual members of an equal-cost multi-path routing (ECMP) group of the forwarding device 1001, and the second group contains only local virtual members of the ECMP group.

The forwarding device 1001 is configured to receive the forwarding strategy distributed by the management device 1002, and perform data forwarding according to the forwarding strategy.

In one example, performing data forwarding according to the forwarding strategy includes: generating a forwarding rule according to the forwarding strategy and a type of the forwarding device 1001; and performing data forwarding according to the forwarding rule.

In one example, the forwarding rule includes a general virtual routing table and a local virtual routing table, and a flow table; generating a forwarding rule according to the forwarding strategy includes: generating a flow table according to the forwarding strategy under the condition that the forwarding device 1001 is an openflow device; and setting a general virtual routing table and a local virtual routing table according to the forwarding strategy under the condition that the forwarding device 1001 is an EVPN device.

In one example, after receiving the forwarding strategy distributed by the management device 1002, the method further includes: receiving an updated forwarding strategy distributed by the management device 1002; and performing data forwarding according to the updated forwarding strategy.

In one example, selecting the next hop includes: selecting all virtual members in the group as next-hop devices and performing load sharing among all virtual members.

In one example, after distributing the forwarding strategy of each forwarding device 1001 to each forwarding device 1001, the management device 1002 also updates the routing information after a network topology changes, updates the forwarding strategy of each forwarding device 1001 according to the updated routing information, and distributes the updated forwarding strategy of each forwarding device 1001 to each forwarding device 1001.

It can be easily found that this embodiment is a system embodiment corresponding to the above-described embodiment, and this embodiment may be implemented in cooperation with the above-described embodiment. The related technical details mentioned in the above embodiments are still valid in this embodiment, and will not be repeated here in order to reduce repetition. Correspondingly, the relevant technical details mentioned in this embodiment can also be applied to the above embodiments.

Figure 11:
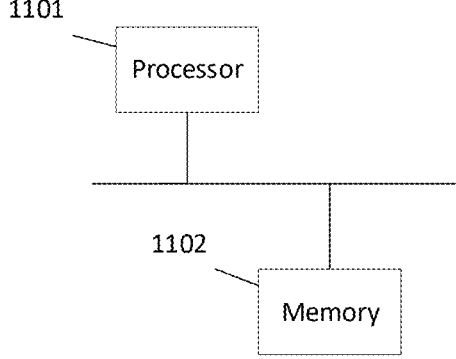
FIG. 11 is a structural schematic diagram of an electronic device according to an embodiment of the present disclosure.

Embodiments of the present application also relate to an electronic device, as shown in FIG. 11, including: at least one processor 1101; and a memory 1102 in communication connection with the at least one processor, wherein the memory 1102 stores instructions executable by the at least one processor 1101, and the instructions are executed by the at least one processor 1101 to perform the data forwarding method according to any of the above embodiments.

The memory 1102 and the processor 1101 are connected by a bus, which may include any number of interconnecting buses and bridges, and the bus connects together the various circuits of the one or more processors 1101 and the memory 1102. The bus can also connect various other circuits, such as peripheral devices, voltage regulators and power management circuits, which are well known in the art, and therefore, will not be described any further herein. A bus interface provides an interface between a bus and a transceiver. The transceiver may be one element or multiple elements, such as multiple receivers and transmitters, that provide a unit for communicating with various other apparatuses over a transmission medium. The information processed by the processor 1101 is transmitted over a wireless medium through the antenna, which further receives the information and delivers the information to the processor 1101.

The processor 1101 is responsible for managing the bus and general processing, and may also provide various functions including timing, peripheral interfaces, voltage regulation, power management and other control functions. The memory 1102 may be configured to store information used by the processor in performing operations.

An embodiment of the present application relates to a computer-readable storage medium, storing a computer program. The computer program, when executed by a processor, implements the method embodiments described above.

That is, those skilled in the art can understand that all or part of the steps in the method of the above embodiments can be completed by instructing related hardware through a program, which is stored in a storage medium and includes several instructions to enable a device (which may be a single chip microcomputer, a chip, etc.) or a processor to execute all or part of the steps of the methods of various embodiments of the present application. The aforementioned storage medium includes a USB flash disk, a mobile hard disk, a Read-Only Memory (ROM), a Random Access Memory (RAM), a magnetic disk or an optical disk and other media that can store program codes.

What is claimed is:

1. A data forwarding method, applied to a forwarding device in an overlay network, the forwarding device in communication connection with a management device, the management device configured to manage at least one forwarding device, each the forwarding device comprising a plurality of virtual members, and the method comprising:

receiving a forwarding strategy distributed by the management device, wherein the forwarding strategy comprises: selecting, under the condition that the forwarding device is a first-hop device, all virtual members in a first group as a next hop and performing load sharing among all the virtual members, selecting, under the condition that the forwarding device is a non-first-hop device, a next hop in a second group, the first group containing all virtual members of an equal-cost multi-path routing called ECMP group of the forwarding device, and the second group containing only local virtual members of the ECMP group; and performing data forwarding according to the forwarding strategy.

2. The data forwarding method according to claim 1, wherein performing data forwarding according to the forwarding strategy comprises:

generating, according to the forwarding strategy and a type of the forwarding device, a forwarding rule; and performing data forwarding according to the forwarding rule.

3. The data forwarding method according to claim 2, wherein the forwarding rule comprises a general virtual routing table and a local virtual routing table, and a flow table;

generating, according to the forwarding strategy, the forwarding rule comprises:

generating a flow table according to the forwarding strategy under the condition that the forwarding device is an openflow device; and setting a general virtual routing table and a local virtual routing table according to the forwarding strategy under the condition that the forwarding device is an Ethernet VPN called EVPN device.

4. The data forwarding method according to claim 1, wherein after receiving the forwarding strategy distributed by the management device, the method further comprises:

receiving an updated forwarding strategy distributed by the management device; and performing data forwarding according to the updated forwarding strategy.

5. A data forwarding method, applied to a management device in an overlay network, the management device in communication connection with at least one forwarding device, the management device configured to manage at least one forwarding device, each the forwarding device comprises a plurality of virtual members, and the method comprises:

acquiring routing information of each the forwarding device;

generating, according to the routing information, a forwarding strategy of each the forwarding device; and distributing the forwarding strategy of each the forwarding device to each the forwarding device for each the forwarding device to receive the forwarding strategy distributed by the management device and perform data forwarding according to the forwarding strategy; wherein the forwarding strategy comprises: selecting, under the condition that the forwarding device is a first-hop device, all virtual members in a first group as a next hop and performing load sharing among all the virtual members, selecting, under the condition that the forwarding device is a non-first-hop device, a next hop in a second group, the first group containing all virtual members of an equal-cost multi-path routing called ECMP group of the forwarding device, and the second group containing only local virtual members of the ECMP group.

6. The data forwarding method according to claim 5, wherein after distributing the forwarding strategy of each the forwarding device to each the forwarding device, the method further comprises:

updating, after a network topology changes, the routing information;

updating, according to the updated routing information, the forwarding strategy of each the forwarding device; and distributing the updated forwarding strategy of each the forwarding device to each the forwarding device.

7. A data forwarding system, comprising a forwarding device and a management device applied to an overlay network; the management device is in communication connection with at least one forwarding device, the management device is configured to manage at least one forwarding device, and each forwarding device comprises a plurality of virtual members; wherein the management device is configured to acquire routing information of each the forwarding device; generate, according to the routing information, a forwarding strategy of each the forwarding device; and distribute the forwarding strategy of each the forwarding device to each the forwarding device for each the forwarding device to receive the forwarding strategy distributed by the management device and perform data forwarding according to the forwarding strategy; the forwarding strategy comprises: selecting, under the condition that the forwarding device is a first-hop device, all virtual members in a first group as a next hop and performing load sharing among all the virtual members, selecting, under the condition that the forwarding device is a non-first-hop device, a next hop in a second group, the first group containing all virtual members of an equal-cost multi-path routing called ECMP group of the forwarding device, and the second group containing only local virtual members of the ECMP group; and the forwarding device is configured to receive the forwarding strategy distributed by the management device, and perform data forwarding according to the forwarding strategy.

8. An electronic device, comprising:

at least one processor; and a memory in communication connection with the at least one processor; wherein, the memory stores instructions executable by the at least one processor, and the instructions are executed by the at least one processor to enable the at least one processor to perform the data forwarding method applied to a forwarding device according claim 1.

9. A non-transitory computer-readable storage medium, storing a computer program, wherein the computer program, when executed by a processor, implements the data forwarding method applied to a forwarding device according to claim 1.

10. The data forwarding method according to claim 2, wherein after receiving the forwarding strategy distributed by the management device, the method further comprises:

receiving an updated forwarding strategy distributed by the management device; and performing data forwarding according to the updated forwarding strategy.

11. The data forwarding method according to claim 3, wherein after receiving the forwarding strategy distributed by the management device, the method further comprises:

receiving an updated forwarding strategy distributed by the management device; and performing data forwarding according to the updated forwarding strategy.

12. An electronic device, comprising:

at least one processor; and a memory in communication connection with the at least one processor; wherein, the memory stores instructions executable by the at least one processor, and the instructions are executed by the at least one processor to enable the at least one processor to perform the data forwarding method applied to a management device according to claim 5.

13. A non-transitory computer-readable storage medium, storing a computer program, wherein the computer program, when executed by a processor, implements the data forwarding method applied to a management device according to claim 5.

14. The data forwarding method according to claim 5, wherein acquiring the routing information of each the forwarding device comprises:

acquiring all routing entries of each logical route instance called vrouter, wherein each routing entry comprises at least one selected from a vrouter identifier, a routing destination network segment and a next hop.

15. The data forwarding method according to claim 5, wherein the forwarding device is a virtual extensible local Area Network tunnel end point called VTEP device.

16. The data forwarding method according to claim 15, wherein the VTEP device is an openflow forwarding device; and generating the forwarding strategy comprises: generating an openflow table.

17. The data forwarding method according to claim 15, wherein the VTEP device is a EVPN forwarding device; and generating the forwarding strategy comprises: generating a boarder gateway protocol called BGP message.

* * * * *